(12) United States Patent
Bland et al.

(10) Patent No.: US 11,254,377 B2
(45) Date of Patent: Feb. 22, 2022

(54) WINGED SPROCKET SEGMENTS WITH NOTCHES

(71) Applicant: Caterpillar Inc., Deerfield, IL (US)

(72) Inventors: Arthur James Bland, Peoria, IL (US); David J. Hakes, Princeville, IL (US)

(73) Assignee: Caterpillar Inc., Peoria, IL (US)

(*) Notice: Subject to any disclaimer, the term of this patent is extended or adjusted under 35 U.S.C. 154(b) by 251 days.

(21) Appl. No.: 16/507,451

(22) Filed: Jul. 10, 2019

(65) Prior Publication Data

US 2021/0009216 A1 Jan. 14, 2021

(51) Int. Cl.
*B62D 55/12* (2006.01)
*B62D 55/20* (2006.01)
*B62D 55/135* (2006.01)

(52) U.S. Cl.
CPC .......... *B62D 55/12* (2013.01); *B62D 55/135* (2013.01); *B62D 55/20* (2013.01)

(58) Field of Classification Search
CPC .... B62D 55/0885; B62D 55/12; B62D 55/20; B62D 55/125; B62D 55/13; B62D 55/135; B65G 23/06; F16H 55/12; F16H 55/30
See application file for complete search history.

(56) References Cited

U.S. PATENT DOCUMENTS

| | | | |
|---|---|---|---|
| 2,302,658 A * | 11/1942 | Artz | B62D 55/12 305/100 |
| 3,880,478 A | 4/1975 | Baylor | |
| 4,332,573 A | 6/1982 | Uchida et al. | |
| 4,425,007 A | 1/1984 | Soeteber | |
| 5,067,931 A | 11/1991 | Nagamatsu et al. | |
| 5,172,965 A * | 12/1992 | Taft | B62D 55/205 305/187 |
| 6,652,043 B2 | 11/2003 | Oertley | |
| 6,883,876 B2 * | 4/2005 | Yamamoto | B62D 55/088 305/115 |
| 7,946,661 B1 | 5/2011 | Freeman | |
| 8,100,483 B2 * | 1/2012 | Diekevers | B62D 55/145 305/104 |
| 8,904,844 B2 | 12/2014 | Kawahara et al. | |
| 9,180,921 B2 | 11/2015 | Joseph Xavier et al. | |
| 2003/0195072 A1 | 10/2003 | Redmond | |
| 2004/0061378 A1 * | 4/2004 | Girard | B62D 55/125 305/199 |
| 2011/0300977 A1 | 12/2011 | Hayami et al. | |

(Continued)

FOREIGN PATENT DOCUMENTS

| | | | |
|---|---|---|---|
| CN | 204403317 U | 6/2015 | |
| DE | 2104500 A1 * | 8/1972 | ............. B62D 55/12 |

(Continued)

*Primary Examiner* — Kip T Kotter
(74) *Attorney, Agent, or Firm* — Law Office of Kurt J. Fugman LLC

(57) ABSTRACT

The sprocket member keeps the sprocket centered within the link box while the notches or cut-outs allow mud, dirt, or other material to move out of the link box formed of the track chain assembly by two track bushings and two track links that form a rectangular shaped perimeter. The spacing provided by the wings of the sprocket member reduce wear on the track links near a track bushing and track link interface such as a press-fit connection by spacing the lugs of the sprocket member away from the interface.

18 Claims, 12 Drawing Sheets

(56) References Cited

U.S. PATENT DOCUMENTS

2011/0306453 A1\* 12/2011 Kawahara .................. B21J 5/02
                                                                       474/162
2015/0176692 A1    6/2015 Roh
2017/0240229 A1\*  8/2017 Cortese .................. E21C 27/24

FOREIGN PATENT DOCUMENTS

| DE | 2160398 | 6/1973 |
| GB | 1251399 | 10/1971 |
| JP | 03904428 B2 | 4/2007 |
| JP | 2008201356 A | 9/2008 |

\* cited by examiner

WINGED SPROCKET SEGMENTS WITH NOTCHES

TECHNICAL FIELD

The present disclosure relates to a sprocket used to drive a track chain assembly of an endless undercarriage drive employed by earth moving, construction and mining equipment and the like. Specifically, the present disclosure relates to a sprocket that is configured to withstand lateral thrust forces, staying centered in a link box of a track chain assembly, and to allow material to exit the link box so over packing of the material in the link box is reduced.

BACKGROUND

Earth moving, construction and mining equipment and the like are often used in rough, off-road terrain. These machines often employ an endless drive with track shoes that is better able to propel the machines in such environments over obstacles and uneven terrain, etc. The track chain assemblies, which include shoes, are held together by a series of interconnected track links, pins and bushings that are supported on the drive sprocket, idler and support rollers of the machine. The drive sprocket, is so called, as it may drive or convey power to the track chain assembly, causing it to revolve about the idler wheels, resulting in linear motion of the machine.

The drive sprocket includes lugs that fit between various inside and outside links of the track chain assembly and typically contact a track chain bushing that spans between the adjacent inside track links and outside track links. As the drive sprocket rotates, a first lug pushes the track chain assembly along a direction by pushing on the track chain bushing. Eventually, the first lug disengages the track chain bushing as a second lug disposed immediately behind the first lug contacts another track chain bushing, forcing the track chain assembly to continue to move along the same direction.

There can be a great deal of lateral force exerted on the sprockets and material such as mud, sand, dirt, rocks, etc. may infiltrate and cause the sprocket and the track chain assembly to wear over time. Also, the traction forces of these machines may lead to excessive wear of the chain links near the bushing press fit due to interaction with the sprocket. This wear can affect the integrity of the joint. In time, this may cause undesirable maintenance to be performed on the sprocket or track chain assembly.

U.S. Pat. No. 3,880,478 to Baylor discloses a crawler chain sprocket that includes a central hub connected to an outer rim on which a plurality of teeth are formed that engage drive a crawler track. Concave sides on the teeth form root face portions between adjacent teeth. Relieved cutouts are formed on the sides of the root face portions in an alternating pattern so that dirt and debris can be expelled from the crawler track without establishing a concentrated, centralized wear pattern on the crawler track bushings. Baylor does not maintain centering of the sprocket in relation to the link box of the track chain assembly. So, the track chain assembly in Baylor is prone to undesirable wear on the links near where they receive the track bushings.

SUMMARY

An undercarriage assembly according to an embodiment of the present disclosure may comprise a track chain assembly including a plurality of track pins and a plurality of track bushings disposed about the plurality of track pins; and a plurality of track links that are connected to each other by at least one of the plurality of track pins and the plurality of track bushings. Each of the plurality of track links may include a rail portion. The undercarriage assembly may further comprise a sprocket member including at least partially a cylindrical configuration defining a circumferential direction, a radial direction, and an axis of rotation. The sprocket member may include a radially inner portion that extends in the radial direction and in the axial direction, defining an inner axial width of the radially inner portion, and a radially outer portion that extends in the axial direction, defining an outer axial width of the radially outer portion. The radially outer portion may also extend along the radial direction, defining an outer circumferential surface, and a plurality of lugs extending radially from the outer circumferential surface. The undercarriage assembly may define a thrust direction along the axis of rotation, and the sprocket member may include a first wing extending from the radially outer portion along the thrust direction. The sprocket member may define a plurality of notches that extend radially through the radially outer portion of the sprocket member.

A sprocket segment according to an embodiment of the present disclosure may comprise a body including at least partially a cylindrical configuration defining a circumferential direction, a radial direction, and an axis of rotation. The body may also include a radially inner portion that extends in the radial direction and in the axial direction, the radially inner portion defining an inner axial width of the radially inner portion, and an inner radial height of the radially inner portion. The radially inner portion may further define a plurality of fastener receiving holes extending axially through the radially inner portion. The body may also include a radially outer portion that extends along the axial direction and the radial direction, defining an outer axial width of the radially outer portion, and an outer radial height of the radially outer portion. The outer axial width of the radially outer portion may be greater than the inner axial width of the radially inner portion, while the radially outer portion may also include an outer undulating circumferential surface. The radially outer portion may further define an inner cylindrical circumferential bearing surface disposed axially on one side of the radially inner portion, and a first wing extending axially from the radially outer portion that is disposed radially and axially adjacent to the inner cylindrical circumferential bearing surface. The first wing may define a first wing radial height that is less than the outer radial height of the radially outer portion. The radially outer portion may also define a plurality of cut-outs extending radially through the radially outer portion disposed axially on the other side of the radially inner portion relative to the first wing.

A sprocket segment according to another embodiment of the present disclosure may comprise a body including at least partially a cylindrical configuration defining a circumferential direction, a radial direction, and an axis of rotation. The body may include a radially inner portion that extends in the radial direction and in the axial direction, the radially inner portion defining an inner axial width of the radially inner portion, and an inner radial height of the radially inner portion. The radially inner portion may further define a plurality of fastener receiving holes extending axially through the radially inner portion. The body may also include a radially outer portion that extends along the axial direction and the radial direction, defining an outer axial width of the radially outer portion, and an outer radial height of the radially outer portion. The outer axial width of the radially outer portion may be greater than the inner axial width of the radially inner portion, and may include an outer undulating circumferential surface. The radially outer portion may further define an inner cylindrical circumferential bearing surface disposed axially on one side of the radially inner portion, and a first wing extending axially from the radially outer portion that is disposed radially and axially adjacent to the inner cylindrical circumferential bearing surface. The first wing may define a first wing radial height that is less than the outer radial height of the radially outer portion. The body may also include a second wing extending axially from the radially outer portion on another side axially of the radially inner portion opposite of the first wing. The second wing may also define a second wing radial height that is less than the outer radial height of the radially outer portion. The radially outer portion may also define a plurality of notches extending radially through the radially outer portion. At least one of the plurality of notches may extend through the first wing and at least another of the plurality of notches may extend through the second wing.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
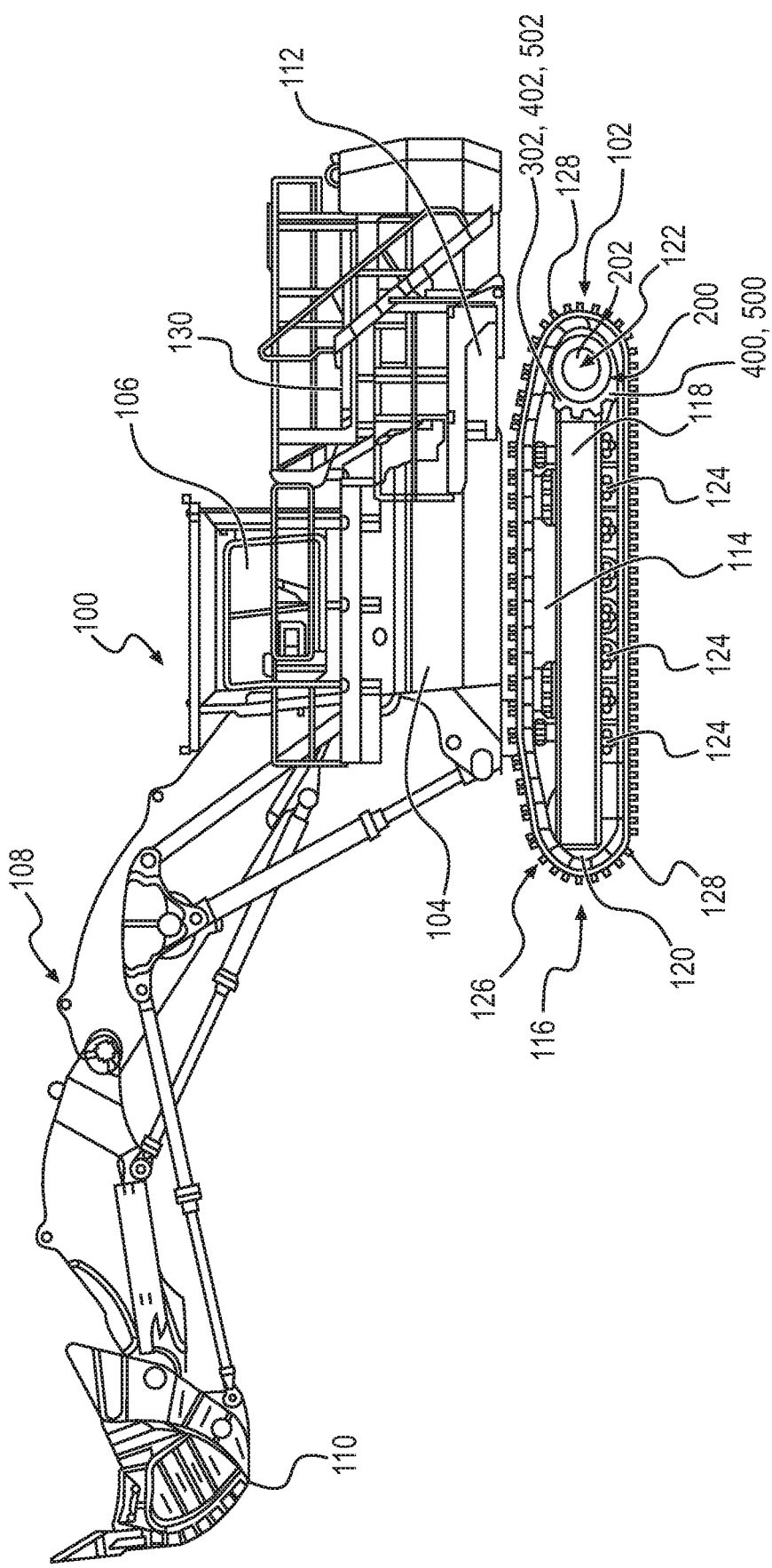
FIG. 1 is a side-view of a machine such a hydraulic mining shovel that may use sprockets with winged sprocket segments with notches according to various embodiments of the present disclosure.
Figure 2:
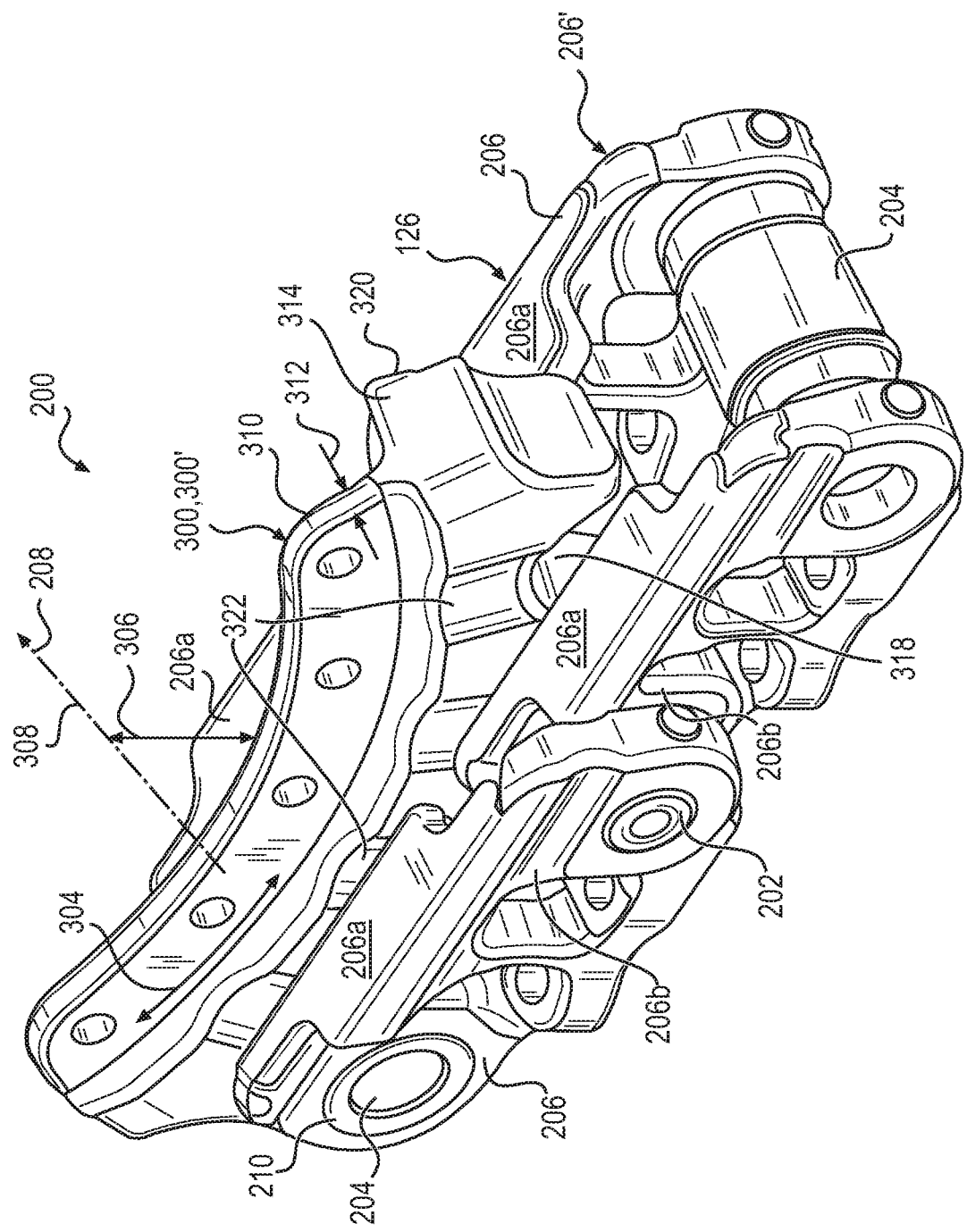
FIG. 2 is a front oriented perspective view of a winged sprocket segment with notches mating with a track chain assembly that may be used in the undercarriage assembly of the machine of FIG. 1 according to a first embodiment of the present disclosure.
Figure 3:
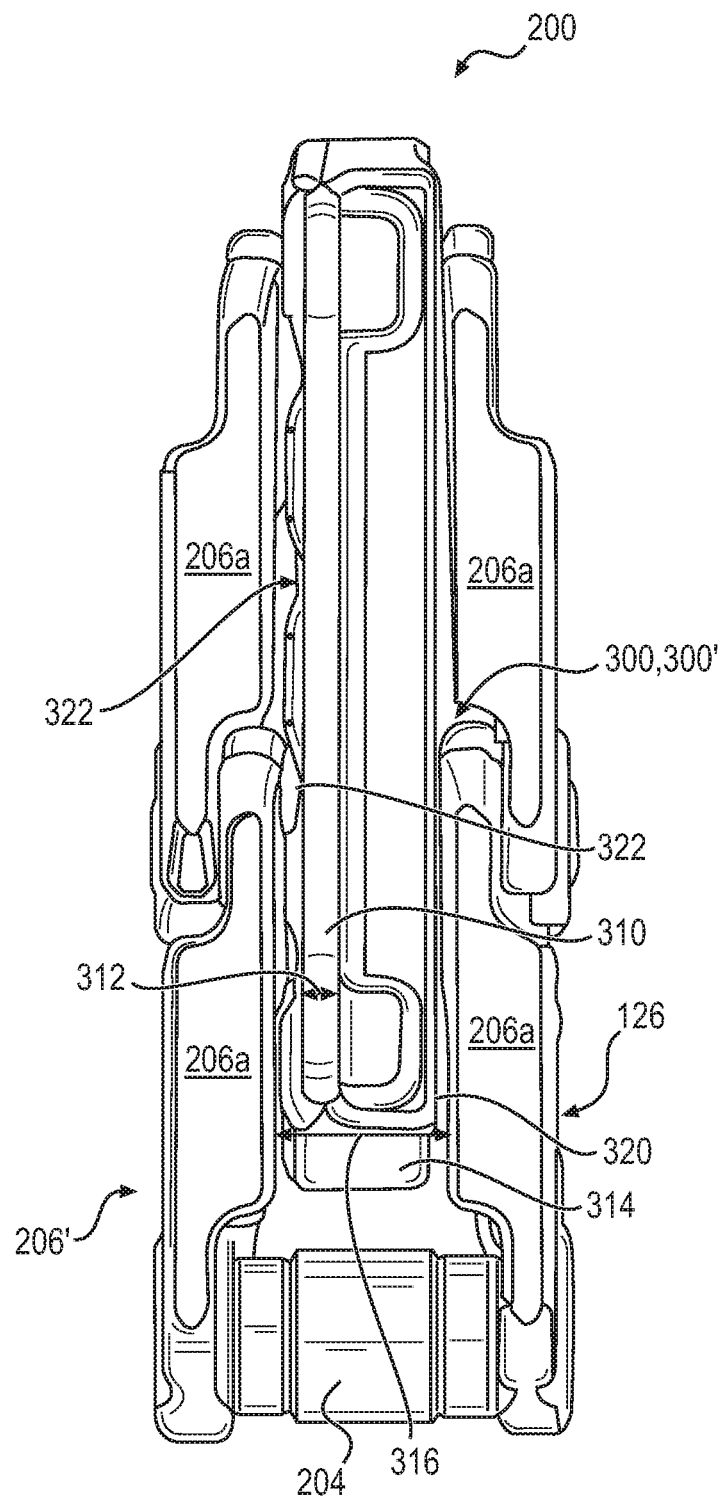
FIG. 3 is a top view of the winged sprocket segment with notches and the track chain assembly of FIG. 2.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

An undercarriage assembly that may use a sprocket member or a sprocket segment according to various embodiments of the present disclosure will now be described. In some embodiments, the sprocket member is a complete sprocket wheel (e.g. having unitary construction). In other embodiments, the sprocket member is a sprocket segment that is attached to a hub to form the drive sprocket wheel assembly, etc. Other configurations for the sprocket member are possible in other embodiments of the present disclosure.

FIG. 1 shows an embodiment of a tracked machine 100 in the form of a hydraulic mining shovel that includes an embodiment of an undercarriage assembly 200 constructed in accordance with principles of the present disclosure. Among other uses, a hydraulic mining shovel can be used to load overburden and ore into haul trucks during the mining process in various surface mine applications.

While the arrangement is illustrated in connection with a hydraulic mining shovel, the arrangement disclosed herein has universal applicability in various other types of machines commonly employ track systems, as opposed to wheels. The term "machine" may refer to any machine that performs some type of operation associated with an industry such as mining, earth moving or construction, or any other industry known in the art. For example, the machine may be an excavator, a wheel loader, a cable shovel, a track type tractor, a dozer, or dragline or the like. Moreover, one or more implements may be connected to the machine. Such implements may be utilized for a variety of tasks, including, for example, lifting and loading.

As shown in FIG. 1, the machine 100 may include a body 104, with a track system 102 attached thereto, and also has a cab 106 to house a machine operator. The machine may also include a boom system 108 pivotally connected at one end to the body 104 and supporting an implement 110 at an opposing, distal end. In embodiments, the implement 110 can be any suitable implement, such as a bucket, a clamshell, a blade, or any other type of suitable device. A control system can be housed in the cab 106 that can be adapted to allow a machine operator to manipulate and articulate the implement 110 for digging, excavating, or any other suitable application.

The body 104 may be supported on a main frame 112 connected to an undercarriage assembly 200. The undercarriage structure 114 includes a supporting structure 118 that supports the track system 102 utilized for movement of the machine 100. The track system 102 may include first and second track roller frame assemblies 116, which are spaced from and adjacent respective first and second sides of the undercarriage assembly 200. It will be appreciated that only one of the track roller frame assemblies 116 is visible in FIG. 1.

Each of the track roller frame assemblies 116 carries an idler wheel 120, a drive sprocket assembly 122, and a plurality of track guiding rollers 124. The drive sprocket assembly 122, is powered in forward and reverse directions by the machine 100. An endless track chain assembly 126 encircles each drive sprocket assembly 122, the idler wheel 120, and the track guiding rollers 124. The track chain assembly 126 includes a plurality of interconnected track pads 128. The track guiding rollers 124 guide the track pads 128 as the track chain assembly 126 is driven by the drive sprocket wheel assembly 122. The track chain assembly 126 may have any track chain member, track pin retention device, and/or track chain assembly. A power source 130 supplies the power to drive the track chain assembly 126 via the sprocket assembly 122, as the lugs 302, 402, 502 of the drive sprocket assembly 122 engage the various track bushings (not shown in FIG. 1), propelling the movement of the track chain assembly 126 as described earlier herein.

Power source 102 may drive undercarriage assembly 200 of machine 100 at a range of output speeds and torques. Power source 102 may be an engine such as, for example, a diesel engine, a gasoline engine, a gaseous fuel-powered engine, or any other suitable engine. Power source 102 may also be a non-combustion source of power such as, for example, a fuel cell, a power storage device, or any other source of power known or that will be devised in the art.

For example, as shown in FIG. 1, the sprocket assembly 112 may comprise a hub 202 that is connected to a drive axle (not shown) of the machine 100 and a sprocket segment 300', 400', 500' (not clearly shown in FIG. 1) that is attached via fasteners, welding, adhesives, etc. to the radial outer edge of the hub 202. This sprocket segment 300', 400', 500' may form the lugs 302, 402, 502 that help to propel the track chain assembly 126.

Referring now at FIGS. 2 thru 14, various embodiments of an undercarriage assembly 200 that may use sprocket members 300, 400, 500 (e.g. sprocket segments 300', 400', 500') according to various embodiments of the present disclosure will now be discussed in detail.

In FIGS. 2 thru 4, 7 thru 9, 12, and 13, an undercarriage assembly 200 according to an embodiment of the present disclosure may comprise a track chain assembly 126 including a plurality of track pins 202, a plurality of track bushings 204 disposed about the plurality of track pins 202, and a plurality of track links 206 that are connected to each other by at least one of the plurality of track pins 202 and the plurality of track bushings 204. Each of the plurality of track links 206 includes a rail portion 206a for supporting the weight of the machine 100 by mating with the rollers 124, and idler wheel 120 as best seen in FIG. 1.

With continued reference to FIGS. 2 thru 4, 7 thru 9, 12, and 13, the sprocket member 300, 400, 500 may include at least partially a cylindrical configuration defining a circumferential direction 304, 404, 504, a radial direction 306, 406, 506, and an axis of rotation 308, 408, 508. The sprocket member 300, 400, 500 may include a radially inner portion 310, 410, 510 that extends in the radial direction 306, 406, 506, and in the axial direction (i.e. along axis of rotation 308, 408, 508), defining an inner axial width 312, 412, 512 of the radially inner portion 310, 410, 510. The sprocket member 300, 400, 500 may also include a radially outer portion 314, 414, 514 that extends in the axial direction 300, 400, 500 (i.e. along axis of rotation 308, 408, 508), defining an outer axial width 316, 416, 516 of the radially outer portion 314, 414, 514. The radially outer portion 314, 414, 514 may also extend along the radial direction 306, 406, 506, defining or terminating in an outer circumferential surface 318, 418, 518, a plurality of lugs 302, 402, 502 (as previously mentioned herein) may be attached to or may otherwise extend radially from the outer circumferential surface 318, 418, 518.

The undercarriage assembly 200 may define a thrust direction 208 along the axis of rotation 308, 408, 508 toward the center or interior of the machine 100.

With continued reference to FIGS. 2 thru 4, 7 thru 9, 12, and 13, the sprocket member may include a first wing 320, 420, 520 extending from the radially outer portion 314, 414, 514 along the thrust direction 208. Moreover, the sprocket member 300, 400, 500 may define a plurality of notches 322, 422, 522 that extend radially through the radially outer portion 314, 414, 514 of the sprocket member 300, 400, 500. The outer axial width 316, 416, 516 of the radially outer portion 314, 414, 514 may be greater than the inner axial width 312, 412, 512 of the radially inner portion 310, 410, 510, as shown in the figures, but not necessarily so.

Also, each of the plurality of track links 206 may be an offset track link 206' (e.g. the body of the track link jogs, producing an "s" shape) as shown in the figures or may be straight (e.g. the body of the track link is shaped more like a "t"), etc. In addition, each of the plurality of track links 206 may include a web 206b extending downwardly from the rail portion 206a, forming a T-shaped configuration.

As best seen in FIGS. 2, 4, 7, 9, and 12, each of the plurality of track links 206 may receive at least one of the plurality track bushings 204, forming a track link and track bushing interface 210. Each track link and track bushing interface 210 may include a press-fit between the track bushing 204 and the track link 206, forming the track link and track bushing interface 210. Other types of interfaces are possible in other embodiments of the present disclosure including slip fits or other types of attachment including using fasteners, welding, adhesives, etc.

Figure 4:
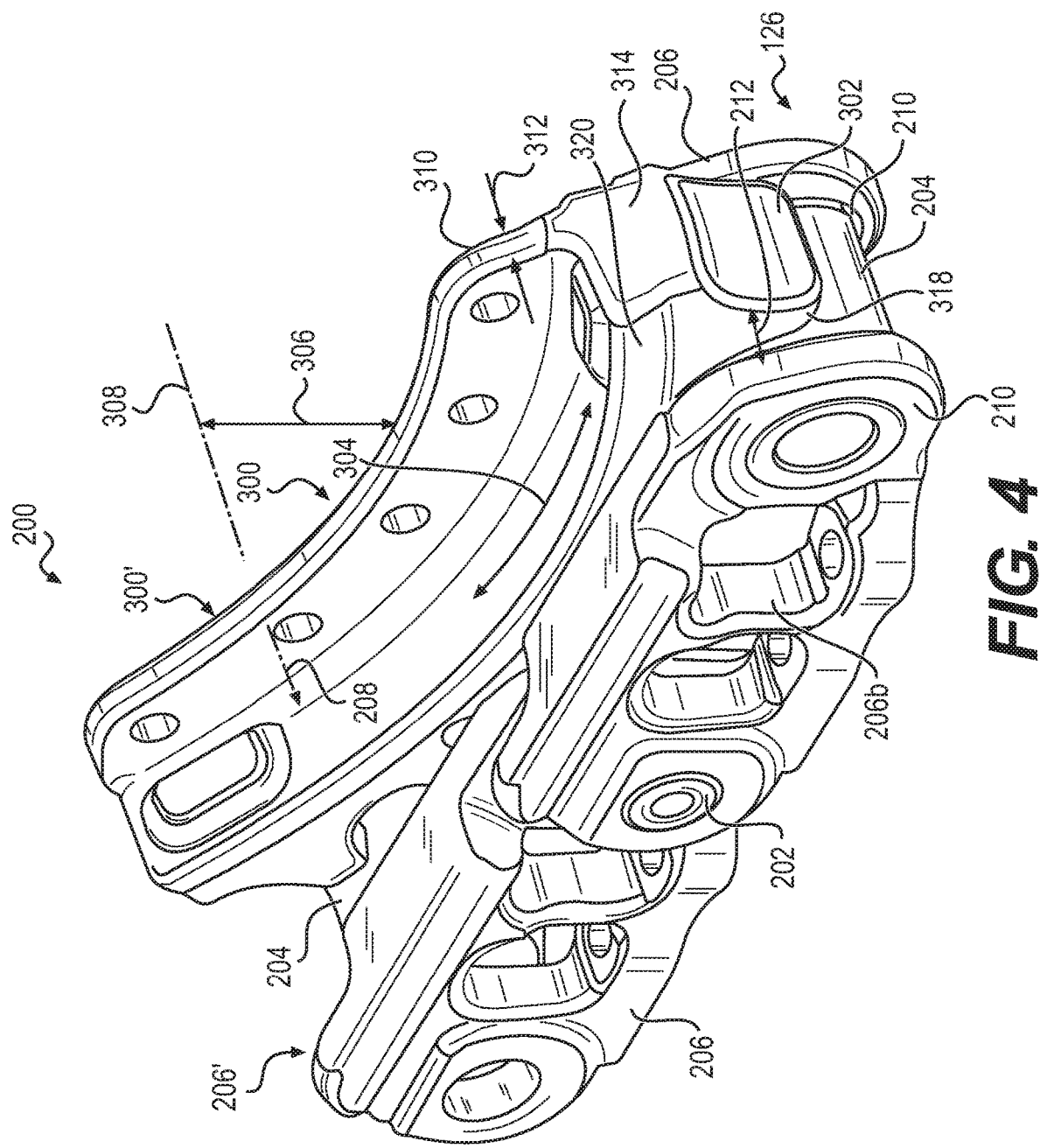
FIG. 4 is a rear oriented perspective view of the winged sprocket segment with notches and the track chain assembly of FIG. 2.
Figure 9:
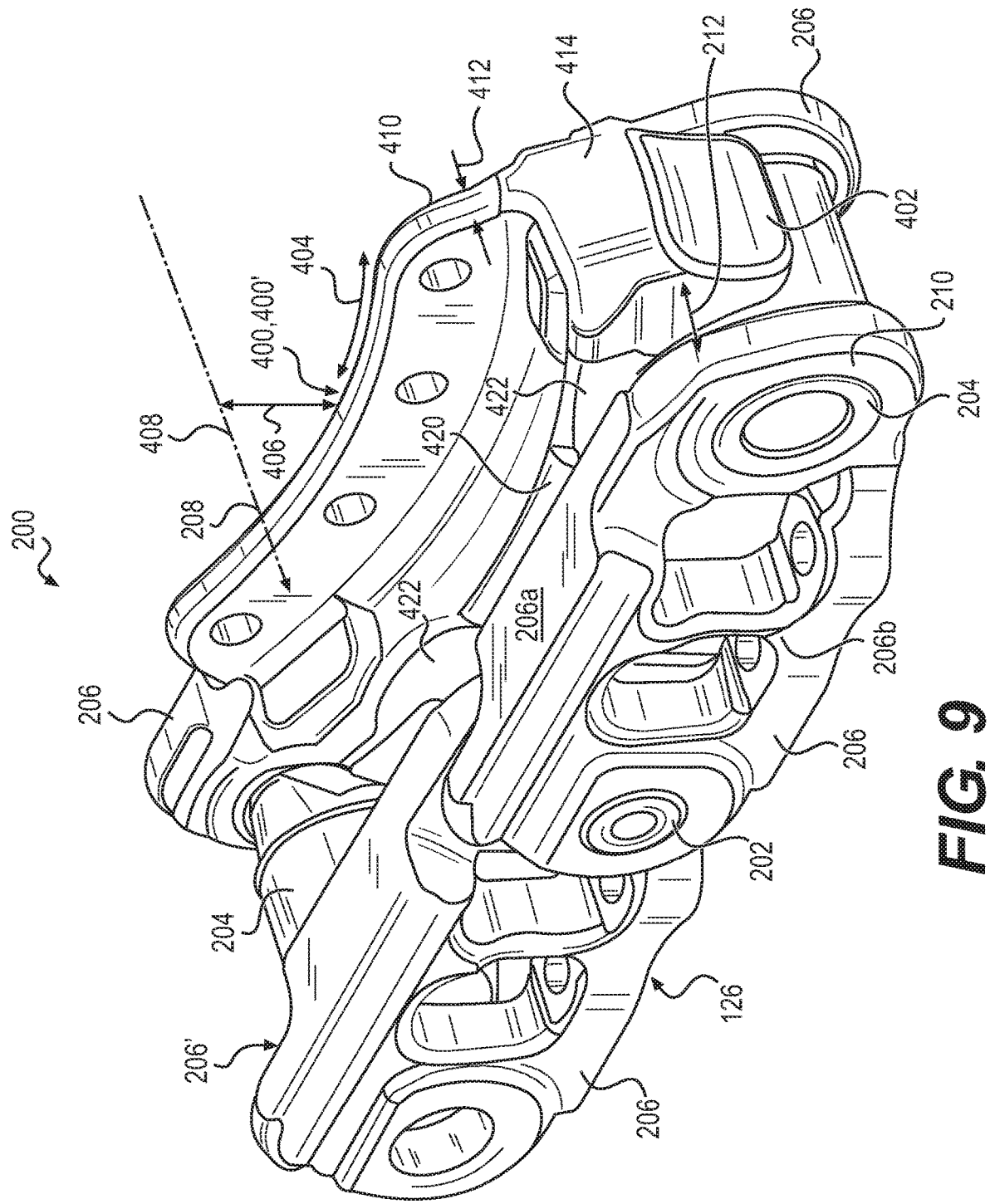
FIG. 9 is a rear oriented perspective view of the winged sprocket segment with notches and the track chain assembly of FIG. 7.
Figure 12:
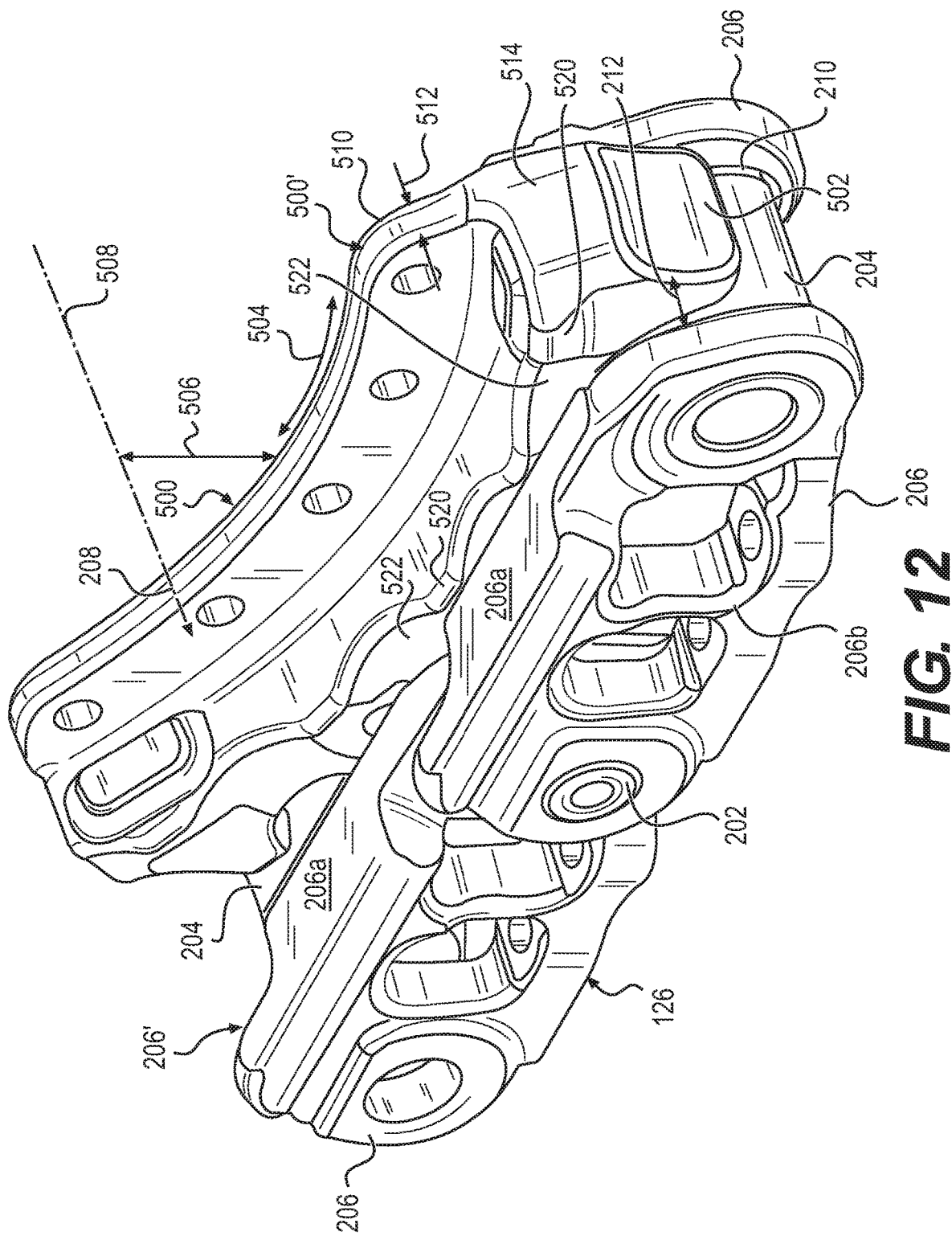
FIG. 12 is a rear oriented perspective view of a winged sprocket segment with notches mating with a track chain assembly that may be used in the undercarriage assembly of the machine of FIG. 1 according to a third embodiment of the present disclosure.

Looking at FIGS. 4, 9, and 12, the first wing 320, 420, 520 may be configured to contact the rail portion 206a, spacing the plurality of lugs 302, 402, 502 of the sprocket member 300, 400, 500 axially away from the track link and track bushing interface 210 a clearance distance 212 ranging from 0 mm to 20 mm. Other values for this clearance distance are possible in other embodiments of the present disclosure.

As alluded to earlier herein, the sprocket member 300, 400, 500 may be made from a single piece of material or may be part of an assembly such as when a sprocket segment 300', 400', 500' is attached to a hub to form the drive sprocket, etc.

Figure 6:
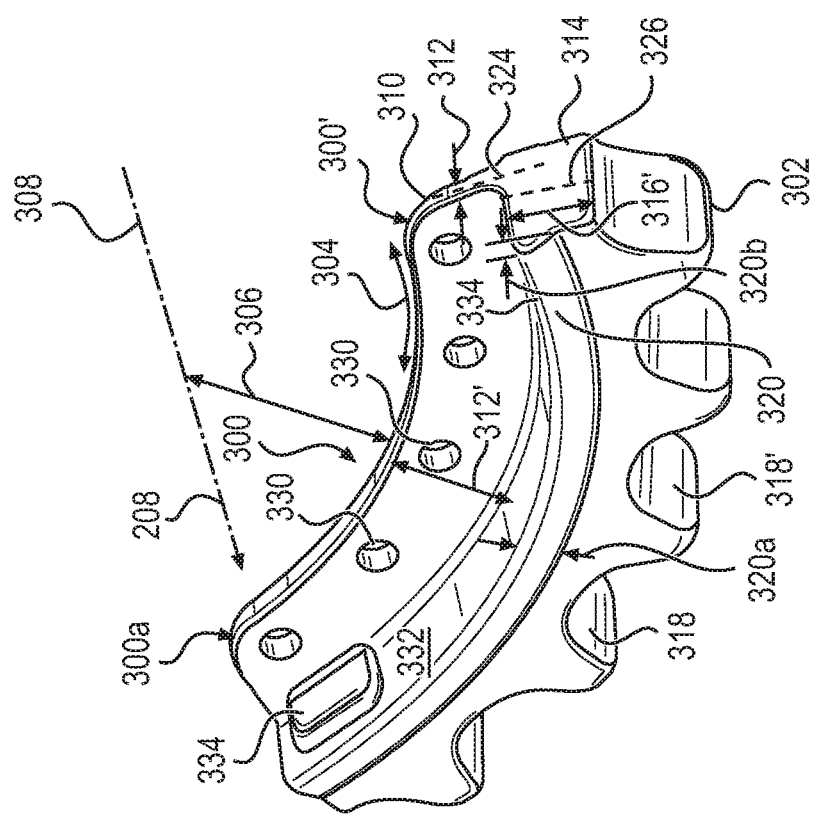
FIG. 6 is a rear oriented perspective view of the winged sprocket segment with notches of FIG. 4 shown in isolation from the track chain assembly.
Figure 5:
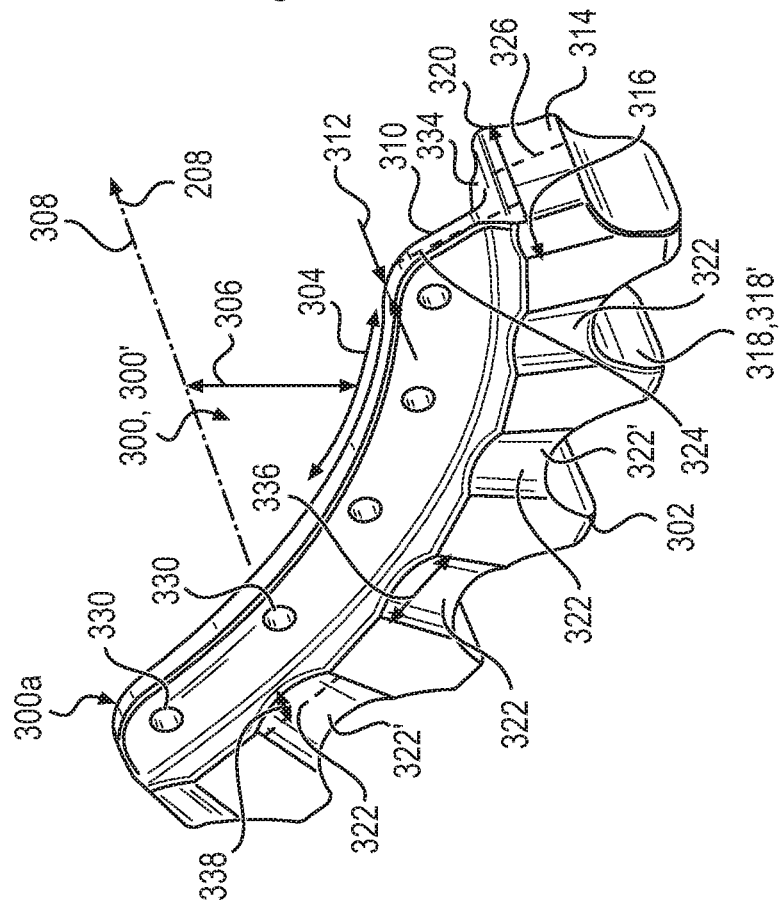
FIG. 5 is a front oriented perspective view of the winged sprocket segment with notches of FIG. 2 shown in isolation from the track chain assembly.
Figure 7:
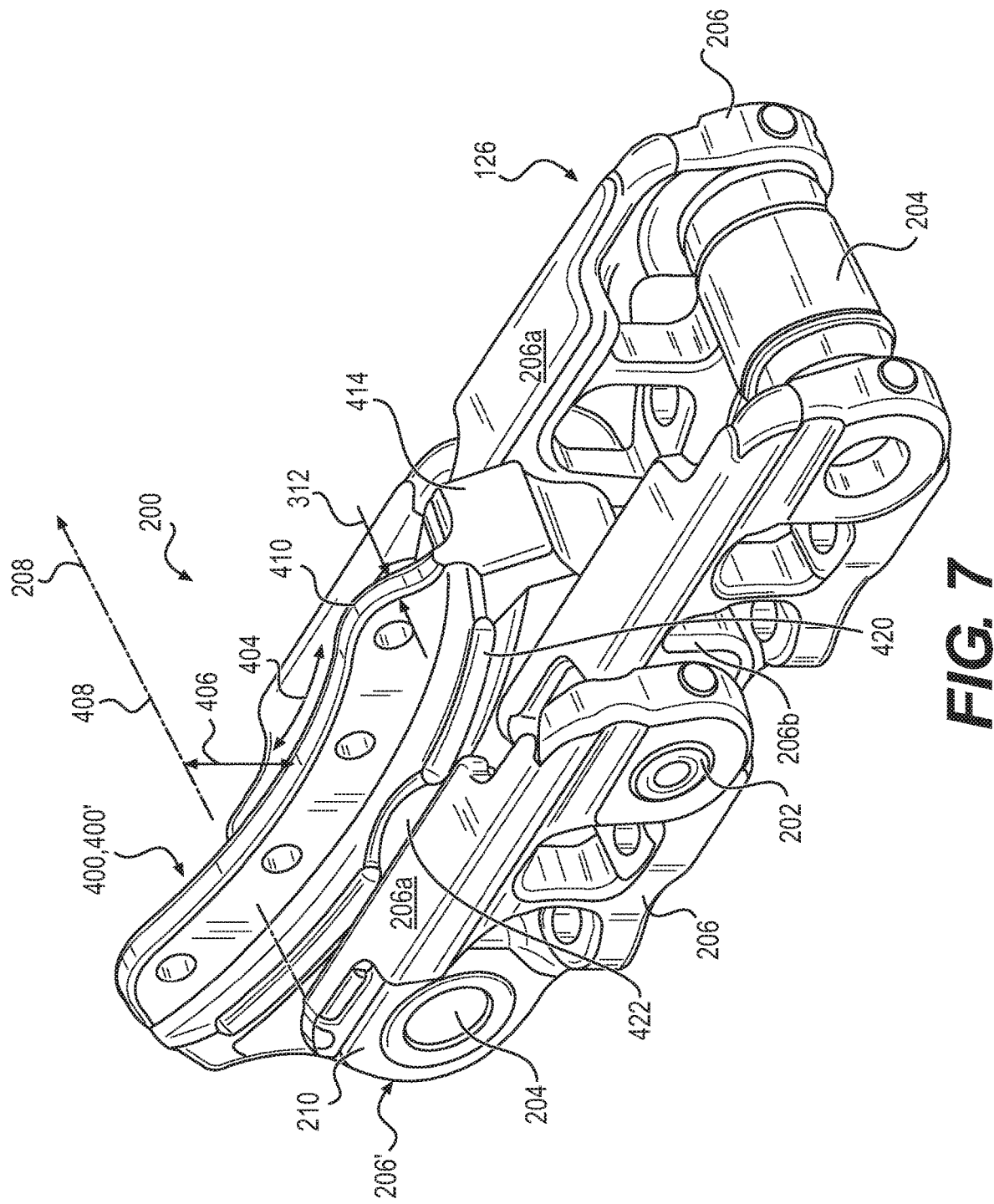
FIG. 7 is a front oriented perspective view of a winged sprocket segment with notches mating with a track chain assembly that may be used in the undercarriage assembly of the machine of FIG. 1 according to a second embodiment of the present disclosure.

Referring now to FIGS. 5 and 6, the sprocket segment 300' may define a radially inner portion axial midplane 324, and a radially outer portion axial midplane 326 that is offset axially from the radially inner portion axial midplane 324. The plurality of notches 322 extends solely through the radially outer portion 314 on a side of the radially outer portion axial midplane 326 that is axially opposite of the first wing 320.

Figures 10, 11:
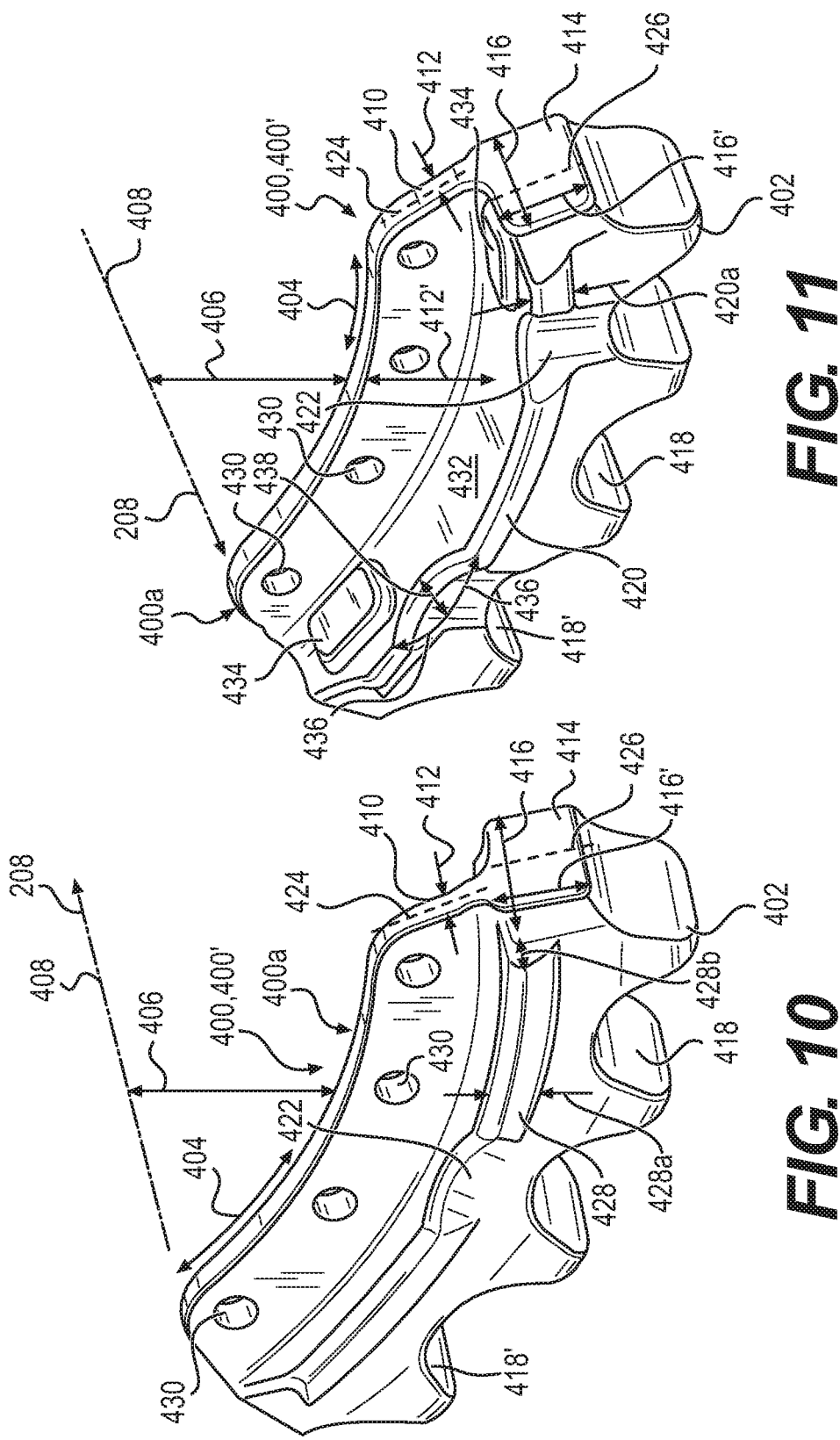
FIG. 10 is a front oriented perspective view of the winged sprocket segment with notches of FIG. 7 shown in isolation from the track chain assembly.
FIG. 11 is a rear oriented perspective view of the winged sprocket segment with notches of FIG. 9 shown in isolation from the track chain assembly.
Figure 13:
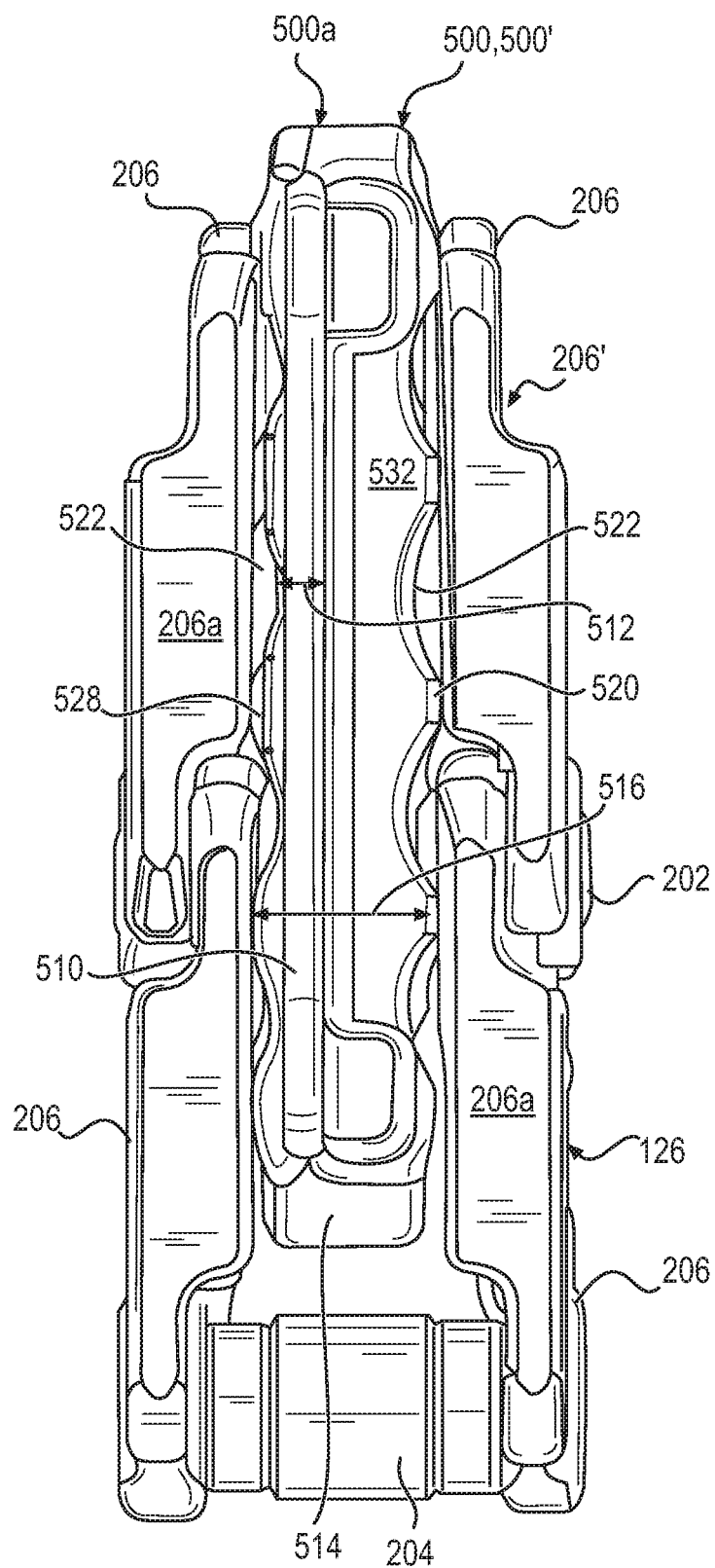
FIG. 13 is a top view of the winged sprocket segment with notches and the track chain assembly of FIG. 12.
Figure 14:
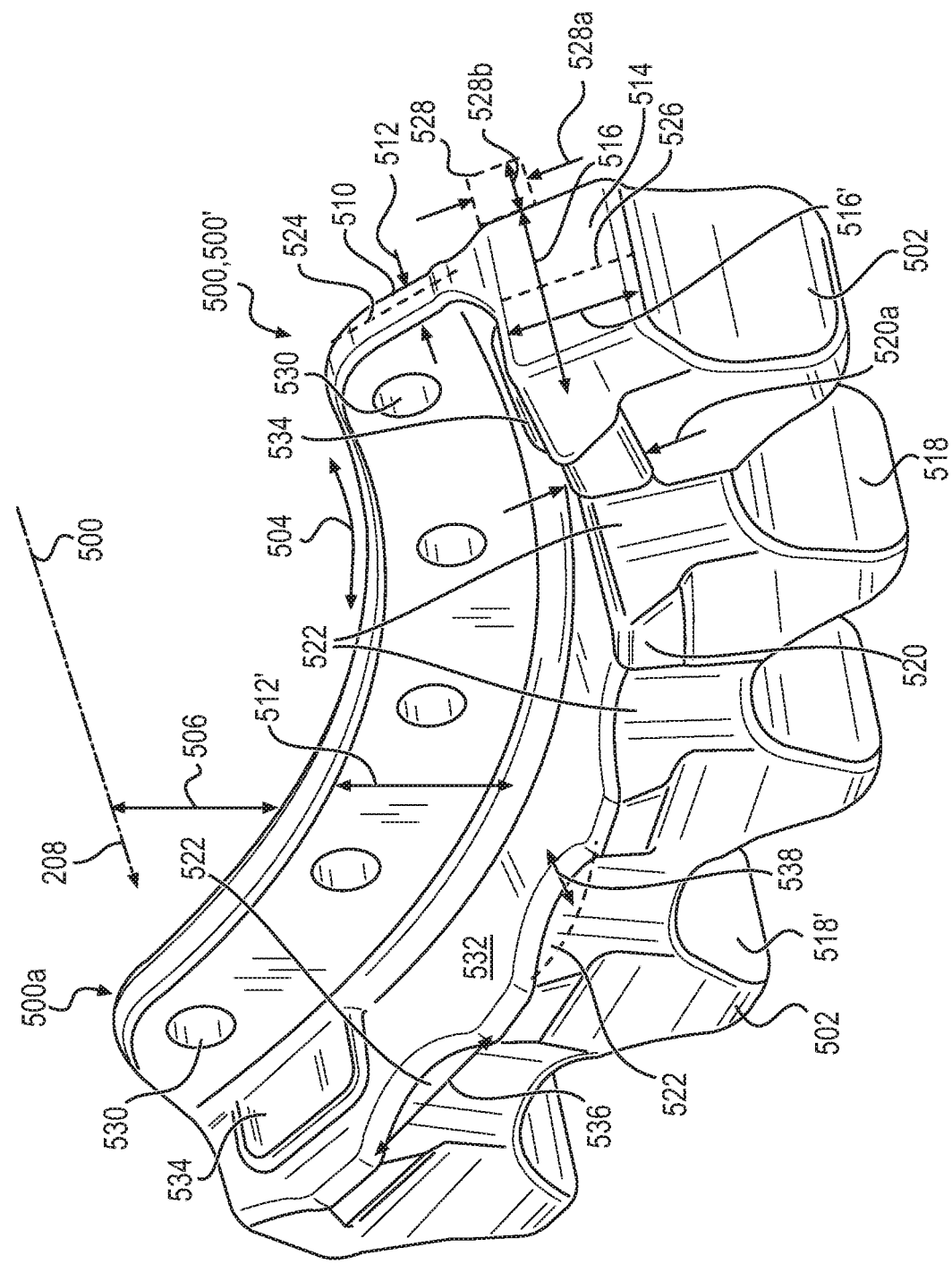
FIG. 14 is a rear oriented perspective view of the winged sprocket segment with notches of FIG. 12 shown in isolation from the track chain assembly.

On the other hand, as shown by FIGS. 10, 11, and 14, the sprocket segment 400', 500' defines a radially inner portion axial midplane 424, 524, and a radially outer portion axial midplane 426, 526 that is offset axially from the radially inner portion axial midplane 424, 524. The sprocket segment 400', 500' may also include a second wing 428, 528 (528 is best seen in FIG. 13) extending axially away from the radially outer portion 414, 514 on another side of the radially outer portion axial midplane 426, 526 that is axially opposite of the first wing 420, 520. For these embodiments, the plurality of notches 422, 522 extend through both the first wing 420, 520 and the second wing 428, 528 of the radially outer portion 414, 514 of the sprocket segment 400', 500'.

Figure 8:
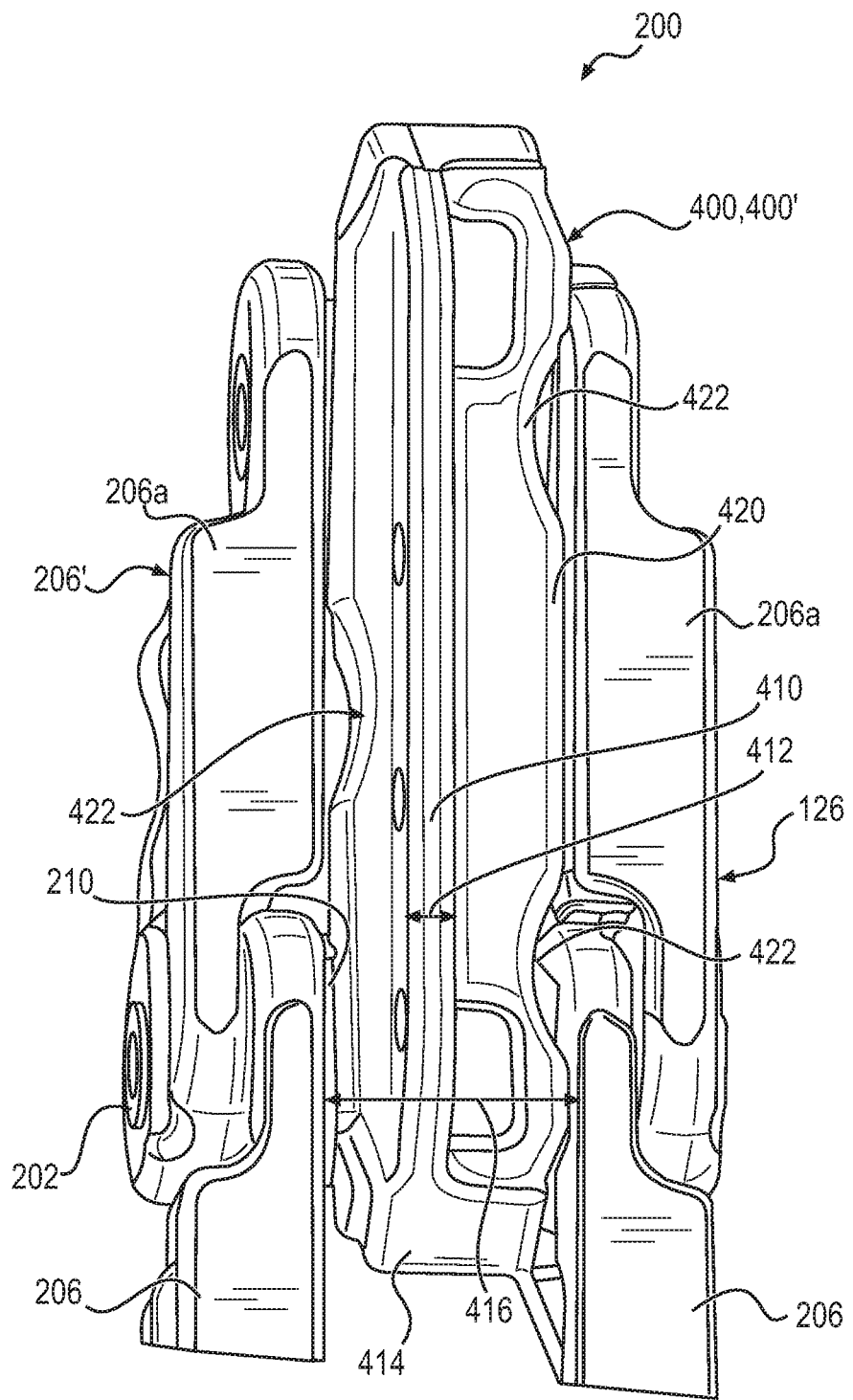
FIG. 8 is a top view of the winged sprocket segment with notches and the track chain assembly of FIG. 7.

In FIGS. 8, 10, and 11, the plurality of notches 422 defines an alternating pattern with one of the plurality of notches 422 on the first wing 420, 520 being spaced circumferentially away from the adjacent one of the plurality of notches 422, 522 on the second wing 428, 528.

Referring again to FIGS. 5 and 6, a sprocket segment 300' according to a first embodiment of the present disclosure that may be provided as a replacement part will now be described by itself.

The sprocket segment 300' may comprise a body 300a including at least partially a cylindrical configuration defining a circumferential direction 304, a radial direction 306, and an axis of rotation 308 as previously alluded to herein.

The body 300a may include a radially inner portion 310 that extends in the radial direction 306 and in the axial direction (i.e. along the axis of rotation 308). The radially inner portion 310 may define an inner axial width 312 of the radially inner portion 310, and an inner radial height 312' of the radially inner portion 310. The radially inner portion 310 further defining a plurality of fastener receiving holes 330 extending axially through the radially inner portion 310 so that the sprocket segment 300' may be attached to a hub to form the drive sprocket.

The body 300a may also include a radially outer portion 314 that extends along the axial direction and the radial direction 306, defining an outer axial width 316 of the radially outer portion 314, and an outer radial height 316' of the radially outer portion 314. The outer axial width 316 of the radially outer portion 314 is greater than the inner axial width 312 of the radially inner portion 310. The radially outer portion 314 may also include an outer undulating circumferential surface 318'.

The radially outer portion 314 further defines an inner cylindrical circumferential bearing surface 332 disposed axially on one side of the radially inner portion 310, and a first wing 320 extending axially from the radially outer portion 314 that is disposed radially and axially adjacent to the inner cylindrical circumferential bearing surface 332. The first wing 320 may define a first wing radial height 320a that is less than the outer radial height 316' of the radially outer portion 314. The radially outer portion 314 also may define a plurality of cut-outs 322' extending radially through the radially outer portion 314 disposed axially on the other side of the radially inner portion 310 relative to the first wing 320.

As alluded to earlier herein, the sprocket segment 300' defines a radially inner portion axial midplane 324, and a radially outer portion axial midplane 326 that is offset axially from the radially inner portion axial midplane 324, thus providing a suitably sized inner cylindrical circumferential bearing surface 332. The outer undulating circumferential surface 318' of the radially outer portion 314 may define the plurality of lugs 302.

Each of the plurality of fastener receiving holes 330 may be disposed in radial alignment with each of the plurality of lugs 302 but not necessarily so. Similarly, each of the plurality of cut-outs 322' may be disposed circumferentially between each of the plurality of lugs 302 but not necessarily so.

At least two keys 334 may extend axially and radially inwardly from the inner cylindrical circumferential bearing surface 332. So, when the sprocket segment 300' is attached to the hub, the inner cylindrical bearing surface 332 may be supported by the outer radial surface of the hub while the keys 334 fit into pockets or recesses located on the outer radial surface of the hub. Hence, as the hub is driven to rotate, so is the sprocket segment 300'.

With continued reference to FIGS. 5 and 6, the plurality of cut-outs 322' may define a maximum circumferential cut-out distance 336 measured in the circumferential direction 304 ranging from 15 mm to 175 mm (may be 10% to 50% of the pitch length), and a maximum axial cut-out depth 338 measured along the axial direction 306 ranging from 1 mm to 75 mm (may be 1% to 50% of the sprocket width). The first wing 320 may define a first wing axial width 320b ranging from 0 mm to 20 mm, while the first wing radial height 320a may range from 1 mm to 50 mm. Any of these features may be differently shaped or dimensioned in other embodiments of the present disclosure.

Focusing now on FIGS. 10, 11, 13 and 14, a sprocket segment 400', 500' according to a second embodiment, and a third embodiment of the present disclosure that may be provided as a replacement part will now be described by themselves.

The sprocket segment 400', 500' may comprise a body 400a, 500a including at least partially a cylindrical configuration defining a circumferential direction 404, 504, a radial direction 406, 506, and an axis of rotation 408, 508. The body 400a, 500a may include a radially inner portion 410, 510 that extends in the radial direction 406, 506, and in the axial direction (i.e. along the axis of rotation 408, 508). The radially inner portion 410, 510 may define an inner axial width 412, 512 of the radially inner portion 410, 510, and an inner radial height 412', 512' of the radially inner portion 410, 510. Also, the radially inner portion 410, 510 may further define a plurality of fastener receiving holes 430, 530 extending axially through the radially inner portion 410, 510.

The body 400a, 500a may also include a radially outer portion 414, 514 that extends along the axial direction, and the radial direction 406, 506, defining an outer axial width 416, 516 of the radially outer portion 414, 514, and an outer radial height 416', 516' of the radially outer portion 414, 514. The outer axial width 416, 516 of the radially outer portion 414, 514 is greater than the inner axial width 412, 512 of the radially inner portion 410, 510, and includes an outer undulating circumferential surface 418', 518'.

In addition, the radially outer portion 414, 514 further defines an inner cylindrical circumferential bearing surface 432, 532 disposed axially on one side of the radially inner portion 410, 510, and a first wing 420, 520 extending axially from the radially outer portion 414, 514 that is disposed radially and axially adjacent to the inner cylindrical circumferential bearing surface 432, 532. The first wing 420, 520 defines a first wing radial height 420a, 520a that is less than the outer radial height 416', 516' of the radially outer portion 414, 514.

A second wing 428, 528 may be provided that extends axially from the radially outer portion 414, 514 on another side axially of the radially inner portion 410, 510 opposite of the first wing 420, 520. The second wing 428, 528 also defines a second wing radial height 428a, 528a that is less than the outer radial height 416', 516' of the radially outer portion 414, 514. The radially outer portion 414, 514 may also define a plurality of notches 422, 522 extending radially through the radially outer portion 414, 514. At least one of the plurality of notches 422, 522 extends through the first wing 420, 520 and at least another of the plurality of notches 422, 522 extending through the second wing 428, 528.

In FIGS. 10 and 11, the plurality of notches 422 defines an alternating circumferential pattern with one of the plurality of notches 422 on the first wing 420 being spaced circumferentially away from the adjacent one of the plurality of notches 422 on the second wing 428.

Conversely, in FIGS. 13 and 14, the plurality of notches 522 defines a synchronized circumferential pattern with one of the plurality of notches 522 on the first wing 520 being circumferentially aligned with the adjacent one of the plurality of notches 522 on the second wing 528.

In FIGS. 10, 11, 13, and 14, at least two keys 434, 534 may extend axially and radially inwardly from the inner cylindrical circumferential bearing surface 432, 532. So, when the sprocket segment 400', 500' is attached to the hub, the inner cylindrical bearing surface 432, 532 may be supported by the outer radial surface of the hub while the keys 434, 534 fit into pockets or recesses located on the outer radial surface of the hub. Hence, as the hub is driven to rotate, so is the sprocket segment 400', 500'.

For the embodiments shown in FIGS. 10, 11, 13, and 14, each of the plurality of notches 422, 522 defines a maximum circumferential notch distance 436, 536 measured in the circumferential direction 404, 504 ranging from 15 mm to 175 mm, and a maximum axial notch depth 438, 538 measured along the axial direction ranging from 1 mm to 75 mm. The first wing 420, 520 may define a first wing axial width 420b, 520b ranging from 0 mm to 20 mm, and the first wing radial height 420a, 520a may range from 1 mm to 50 mm. Likewise, the second wing 428, 528 may define a second wing axial width 428b, 528b ranging from 0 mm to 20 mm, and the second wing radial height 428a, 528a may range from 1 mm to 50 mm. Any of these features may be differently shaped or dimensioned in other embodiments of the present disclosure.

For many embodiments, the sprocket member may be cast using iron, grey-iron, steel or other suitable materials. The sprocket member may be split into multiple parts that may also be split into multiple parts. For example, the lugs by be attached to the sprocket segment. The lugs may also be cast using iron, grey-iron, steel or other suitable materials. The lug may be made from a different material than the sprocket member. Since the lugs are smaller than the sprocket member, a material may be used to form the lugs that is difficult to use in larger castings. Other manufacturing processes may be used to make the lugs such as any type of machining, forging, etc. For example, steel or "tough steel" may be used to create the lugs. Lugs may also be coated, heat treated, etc. to provide suitable characteristics for various applications.

INDUSTRIAL APPLICABILITY

In practice, a sprocket assembly, a sprocket member, a sprocket segment, and an undercarriage assembly according to any embodiment described herein may be sold, bought, manufactured or otherwise obtained in an OEM or aftermarket context.

The various embodiments of the sprocket member may keep the sprocket centered within the link box while the notches or cut-outs may help mud, dirt, or other material to move out of the link box formed by two track bushings and two track links that form a rectangular shaped perimeter. The spacing provided by the wings of the sprocket member may help to reduce wear on the track links near a track bushing and track link interface such as a press-fit connection.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. An undercarriage assembly comprising:
   a track chain assembly including
      a plurality of track pins and a plurality of track bushings disposed about the plurality of track pins; and
      a plurality of track links that are connected to each other by at least one of the plurality of track pins and the plurality of track bushings, wherein each of the plurality of track links includes a rail portion;
   a sprocket member including at least partially a cylindrical configuration defining a circumferential direction, a radial direction, and an axis of rotation, the sprocket member including
      a radially inner portion that extends in the radial direction and in the axial direction, defining an inner axial width of the radially inner portion;
      a radially outer portion that extends in the axial direction, defining an outer axial width of the radially outer portion, the radially outer portion also extending along the radial direction, defining an outer circumferential surface; and
      a plurality of lugs extending radially from the outer circumferential surface;
      wherein the undercarriage assembly defines a thrust direction along the axis of rotation, and the sprocket member includes a first wing extending from the radially outer portion along the thrust direction, the sprocket member defining a plurality of notches that extend radially through the radially outer portion of the sprocket member;
      wherein the sprocket member includes a plurality of sprocket segments that each includes at least some of the plurality of lugs extending from the radially outer portion, and wherein each of the plurality of sprocket segments defines a radially inner portion axial midplane, and a radially outer portion axial midplane that is offset axially from the radially inner portion axial midplane, and each of the plurality of sprocket segments includes an inner cylindrical circumferential bearing surface of the radially outer portion that is disposed axially on one side of the radially inner portion, and a key extending from the inner cylindrical circumferential bearing surface.

2. The undercarriage assembly of claim 1 wherein each of the plurality of track links is an offset track link and the outer axial width of the radially outer portion is greater than the inner axial width of the radially inner portion.

3. The undercarriage assembly of claim 1 wherein each of the plurality of track links includes a web extending downwardly from the rail portion, forming a T-shaped configuration.

4. The undercarriage assembly of claim 1 wherein each of the plurality of track links receives at least one of the plurality of track bushings, forming a track link and track bushing interface.

5. The undercarriage assembly of claim 4 wherein each track link and track bushing interface includes a press-fit between the track bushing and the track link, forming the track link and track bushing interface.

6. The undercarriage assembly of claim 5 wherein the first wing is configured to contact the rail portion, spacing the plurality of lugs of the sprocket member axially away from the track link and track bushing interface a clearance distance ranging from 0 mm to 20 mm.

7. The undercarriage assembly of claim 1 wherein the plurality of notches extends solely through the radially outer portion on a side of the radially outer portion axial midplane that is axially opposite of the first wing.

8. The undercarriage assembly of claim 1 wherein the sprocket segment includes a second wing extending axially away from the radially outer portion on another side of the radially outer portion axial midplane that is axially opposite of the first wing, and the plurality of notches extend through both the first wing and the second wing of the radially outer portion of the sprocket segment.

9. The undercarriage assembly of claim 8 wherein the plurality of notches defines an alternating pattern with one of the plurality of notches on the first wing being spaced circumferentially away from the adjacent one of the plurality of notches on the second wing.

10. A sprocket segment comprising:
a body including at least partially a cylindrical configuration defining a circumferential direction, a radial direction, and an axis of rotation, the body including
a radially inner portion that extends in the radial direction and in the axial direction, the radially inner portion defining an inner axial width of the radially inner portion, and an inner radial height of the radially inner portion, the radially inner portion further defining a plurality of fastener receiving holes extending axially through the radially inner portion; and
a radially outer portion that extends along the axial direction and the radial direction, defining an outer axial width of the radially outer portion, and an outer radial height of the radially outer portion, the outer axial width of the radially outer portion being greater than the inner axial width of the radially inner portion, the radially outer portion also including an outer undulating circumferential surface;
wherein the radially outer portion further defines an inner cylindrical circumferential bearing surface disposed axially on one side of the radially inner portion, and a first wing extending axially from the radially outer portion that is disposed radially and axially adjacent to the inner cylindrical circumferential bearing surface, the first wing defining a first wing radial height that is less than the outer radial height of the radially outer portion, the radially outer portion also defining a plurality of cut-outs extending radially through the radially outer portion disposed axially on the other side of the radially inner portion relative to the first wing, and the radially outer portion further includes at least two keys extending axially and radially inwardly from the inner cylindrical circumferential bearing surface.

11. The sprocket segment of claim 10 wherein the sprocket segment defines a radially inner portion axial midplane, and a radially outer portion axial midplane that is offset axially from the radially inner portion axial midplane, and the outer undulating circumferential surface of the radially outer portion defines a plurality of lugs.

12. The sprocket segment of claim 11 wherein each of the plurality of fastener receiving holes are disposed in radial alignment with each of the plurality of lugs.

13. The sprocket segment of claim 12 wherein each of the plurality of cut-outs are disposed circumferentially between each of the plurality of lugs, and the radially outer portion further includes at least two keys extending axially and radially inwardly from the inner cylindrical circumferential bearing surface.

14. The sprocket segment of claim 13 wherein each of the plurality of cut-outs defines a maximum circumferential cut-out distance measured in the circumferential direction ranging from 15 mm to 175 mm, a maximum axial cut-out depth measured along the axial direction ranging from 1 mm to 75 mm, the first wing defines a first wing axial width ranging from 0 mm to 20 mm, and the first wing radial height ranges from 1 mm to 50 mm.

15. A sprocket segment comprising:
a body including at least partially a cylindrical configuration defining a circumferential direction, a radial direction, and an axis of rotation, the body including
a radially inner portion that extends in the radial direction and in the axial direction, the radially inner portion defining an inner axial width of the radially inner portion, and an inner radial height of the radially inner portion, the radially inner portion further defining a plurality of fastener receiving holes extending axially through the radially inner portion; and
a radially outer portion that extends along the axial direction and the radial direction, defining an outer axial width of the radially outer portion, and an outer radial height of the radially outer portion, the outer axial width of the radially outer portion being greater than the inner axial width of the radially inner portion, and including an outer undulating circumferential surface;
wherein the radially outer portion further defines an inner cylindrical circumferential bearing surface disposed axially on one side of the radially inner portion, and a first wing extending axially from the radially outer portion that is disposed radially and axially adjacent to the inner cylindrical circumferential bearing surface, the first wing defining a first wing radial height that is less than the outer radial height of the radially outer portion, and a second wing extending axially from the radially outer portion on another side axially of the radially inner portion opposite of the first wing, the second wing also defining a second wing radial height that is less than the outer radial height of the radially outer portion, the radially outer portion also defining a plurality of notches extending radially through the radially outer portion, at least one of the plurality of notches extending through the first wing and at least another of the plurality of notches extending through the second wing; and further comprising at least two keys extending axially and radially inwardly from the inner cylindrical circumferential bearing surface.

16. The sprocket segment of claim 15 wherein the plurality of notches defines an alternating circumferential pattern with one of the plurality of notches on the first wing being spaced circumferentially away from the adjacent one of the plurality of notches on the second wing.

17. The sprocket segment of claim 15 wherein the plurality of notches defines a synchronized circumferential pattern with one of the plurality of notches on the first wing being circumferentially aligned with the adjacent one of the plurality of notches on the second wing.

18. The sprocket of claim 15 wherein each of the plurality of notches defines a maximum circumferential notch distance measured in the circumferential direction ranging from 15 mm to 175 mm, a maximum axial notch depth measured along the axial direction ranging from 1 mm to 75 mm, the first wing defines a first wing axial width ranging from 0 mm to 20 mm, the first wing radial height ranges from 1 mm to 50 mm, the second wing defines a second wing axial width ranging from 0 mm to 20 mm, and the second wing radial height ranges from 1 mm to 50 mm.

* * * * *